Feb. 26, 1935.                J. B. FISHER                1,992,366

ARITHMETIC TEACHING DEVICE

Filed June 27, 1932

INVENTOR

*J. B. Fisher*

BY

ATTORNEY

Patented Feb. 26, 1935

1,992,366

UNITED STATES PATENT OFFICE 1,992,366

ARITHMETIC TEACHING DEVICE

Joseph B. Fisher, Strathmore, Calif.

Application June 27, 1932, Serial No. 619,363

1 Claim. (Cl. 35—2)

This invention relates to teaching devices particularly for use in schools for elementary classes. My principal object is to provide a device of this general character for the purpose of teaching the rudiments of arithmetic to beginners in such a manner as to present this subject in a more attractive and interesting manner than is ordinarily the case and with which blackboards, pencils or other separate instrumentalities are necessary.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views.

Figure 1:
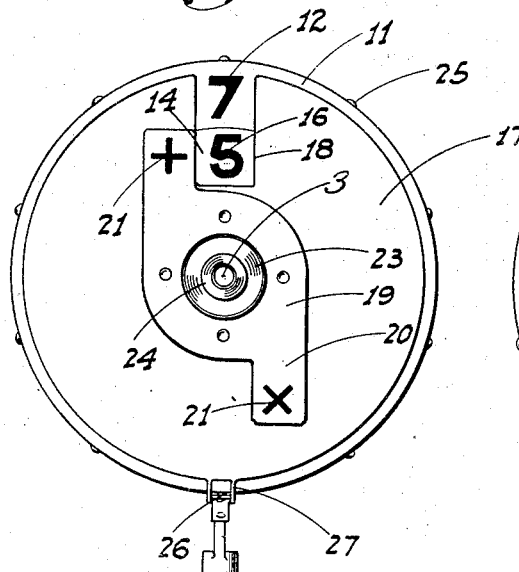
Fig. 1 is a view of the device showing the arithmetic teaching features in position to teach addition.
Figure 2:
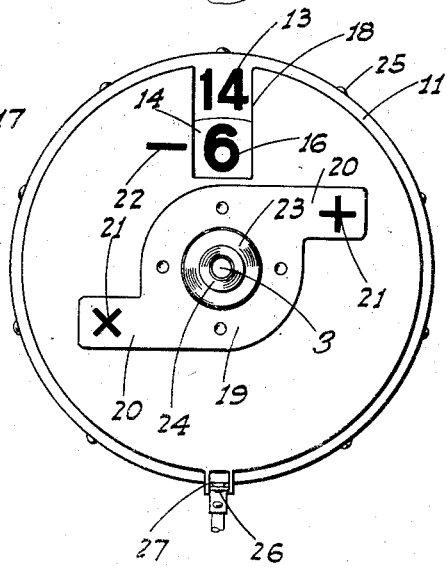
Fig. 2 is a similar view showing the parts positioned to teach subtraction.
Figure 3:
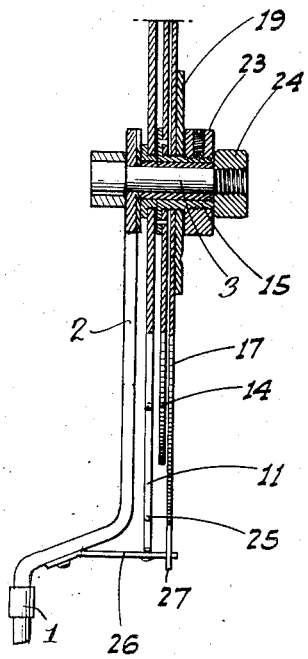
Fig. 3 is an enlarged sectional elevation of the arithmetic teaching dials.
Figure 4:
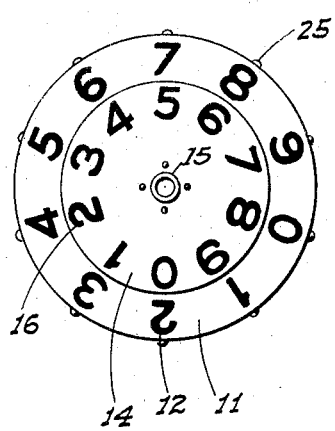
Fig. 4 is a front face view of a pair of numbered dials assembled together.
Figure 5:
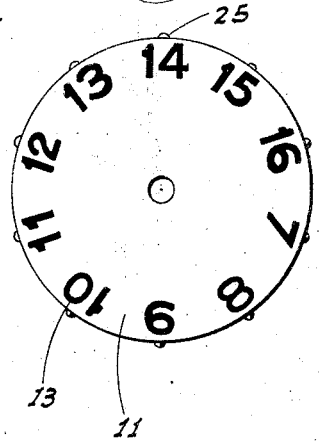
Fig. 5 is a back face view of the reversible dial.

Referring now more particularly to the characters of reference on the drawing, the numeral 1 denotes a pedestal or stand of suitable character, terminating in a vertical arm 2, which adjacent its upper end supports a horizontal shaft or spindle 3.

A disc 11 is turnably and removably mounted on the shaft 3. This disc has evenly spaced numbers 12 leading from 0 to 9 and readily arranged on one side and similarly spaced numbers 13 on the opposite side reading from 7 to 16 for instance. Another small disc 14 is fixed on a bushing 15 turnable on the shaft immediately in front of the disc 11. This smaller disc exposes the row of numbers on the disc 11 as shown and has the same number of numbers 16 thereon evenly spaced thereabout and preferably reading from 0 to 9.

In front of the disc 14 is a cover plate 17 mounted on the bushing 15 and covering all the numbers on both discs except for a radially alined pair of the same which may be exposed through a vertical radial slot 18 in said plate. Turnable on the bushing 15 in front of the cover plate is a member 19 having opposed tangential extensions 20 on which are printed plus and multiplication signs 21. The extensions and signs are disposed relative to the slot 18 so that when said member is properly turned one sign or the other will appear to the left of the slot 18 in alinement with the row of numbers of the disc 14. Said extension then covers a minus sign 22 printed on the cover plate to the left of the slot 18.

The bushing 15 has a thumb nut 23 on the end of the same in front of the member 19 whereby the practically concealed disc 14 may be readily turned. A removable finger nut 24 is threaded on the outer end of the shaft 3 in front of the nut 23 and normally holds all parts against removal. The disc 11 has a plurality of peripheral nubs 25 spaced to correspond with the spacing of the numbers thereon and yieldably engaging a spring catch 26 projecting from the pedestal 1. The cover plate has a small fork 27 depending therefrom and straddling the catch member so as to prevent said plate from turning.

In operation if addition is to be taught the member 19 is turned so as to place the plus mark to the left of the slot 18 and the discs 11 and 14 are turned to expose any desired pair of numbers.

If the numbers are to be multiplied the member 19 is turned to bring the multiplication sign to the left of the slot.

For subtraction larger number for the minuend are necessary. The disc 11 is therefore reversed to expose the larger numbers on the back of the same to the front. This is done by first removing the nut 23 and withdrawing the bushing 15 and parts mounted thereon as a unit, which exposes the disc 11 for removal and reversal. After the parts are replaced the member 19 is turned so that the minus sign on the plate 17 is exposed for use.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

An arithmetic teaching device including a cover plate having a radial slot, means to expose numerals in superposed relation through the slot, an element independently turnable in front of the cover plate, a pair of opposed tangential extensions on the element, the element being turnable to move each extension into alinement with one edge of the slot adjacent the exposed numerals, and an arithmetical symbol on each extension.

JOSEPH B. FISHER.